Patented June 21, 1927.

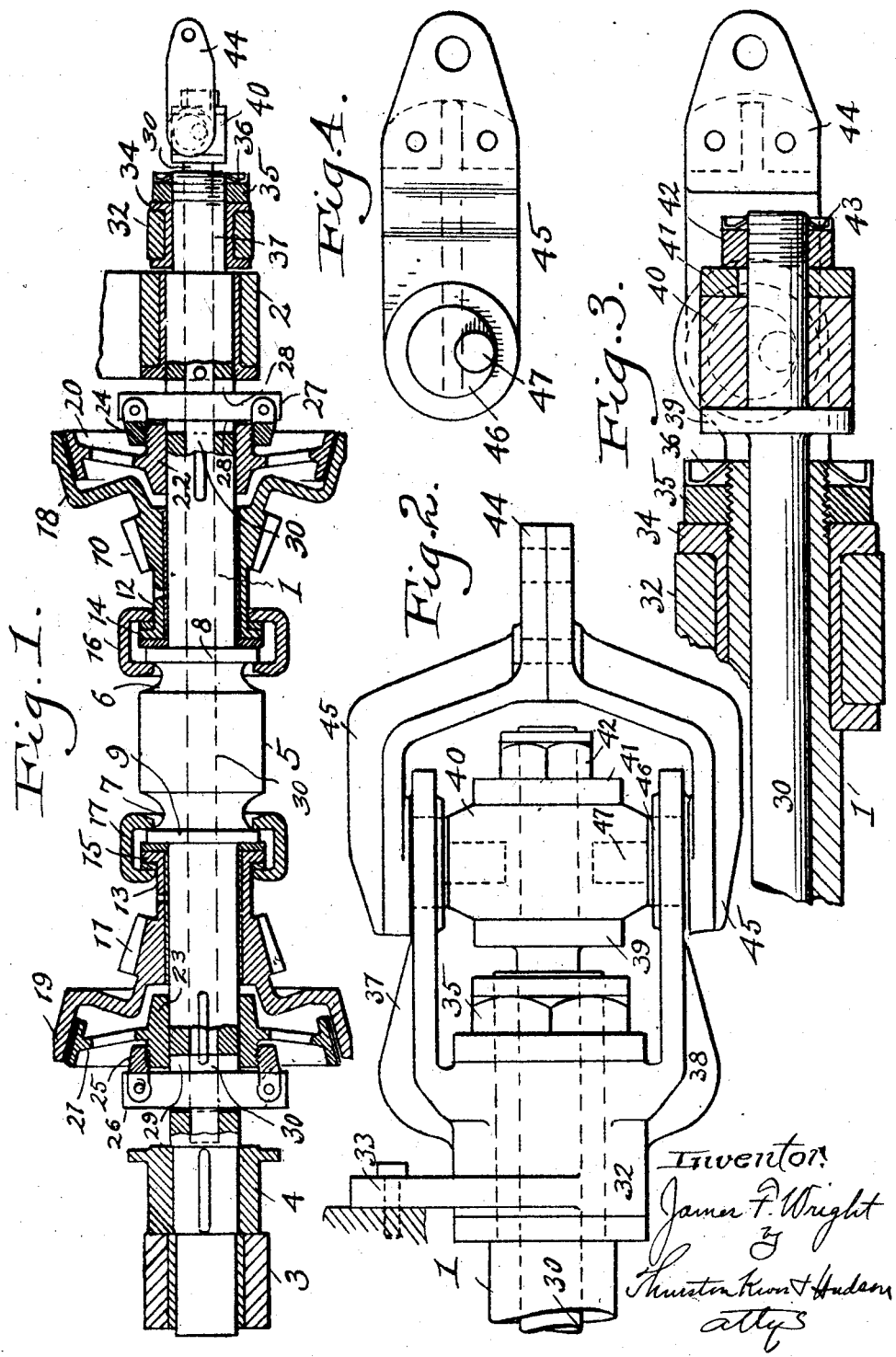

1,632,865

UNITED STATES PATENT OFFICE.

JAMES F. WRIGHT, OF CLEVELAND, OHIO, ASSIGNOR TO THE McMYLER INTERSTATE COMPANY, OF BEDFORD, OHIO, A CORPORATION OF OHIO.

CLUTCH-OPERATING MECHANISM.

Application filed December 9, 1922. Serial No. 605,829.

The present invention relates to clutch operating mechanism and more particularly to a double thrust clutch operating device for simultaneously shifting right and left hand clutch members to move one to its engaging position as the other is moved to inoperative position. The clutch shifting mechanism, as shown and described herein, is applied to friction cone clutches such as are employed in mechanism for swinging a crane.

It is an object of the invention to provide an efficient clutch shifting mechanism comprising few parts which can be easily assembled, is conveniently located occupying a minimum of space and providing a positive release.

A further object is to provide a shifter operable by a lever at the end of the shaft on which the clutches are mounted, the lever being shifted in either direction from a neutral position in which both clutches are disengaged to engage either of the clutches. The shifter being mounted on the end of the shaft, all the thrust produced in setting up the clutches is self-contained within the shaft, no side pressure being applied to the supporting bearings.

The other objects will be apparent from the following description and accompanying drawings.

The following description and accompanying drawings set forth in detail certain means embodying my invention, the disclosed means, however, constituting but one of the various mechanical forms in which the principle of the invention may be employed.

Reference should be had to the accompanying drawings in which Fig. 1 is a sectional view showing the operating shaft of a crane swinging mechanism with the improved clutch mechanism thereon; Fig. 2 is a top plan view on an enlarged scale of the supporting bracket and operating lever at the end of the shaft; Fig. 3 is a longitudinal section through the parts shown in Fig. 2; Fig. 4 is a detail plan view of one of the arms of the forked lever.

Referring to the accompanying drawings, the crane sluing shaft 1 is hollow and has reduced ends journaled in fixed supports 2 and 3. A bearing member 4 is fixed to the shaft 1 within the fixed support 3 and engages the inner face of the support to prevent longitudinal movement of the shaft 1. The shaft 1, midway between the supports 2 and 3 has an enlarged portion 5 with peripheral grooves 6 and 7 adjacent the ends thereof forming flanges 8 and 9 at the ends of the enlarged portion 5. Bevel gears 10 and 11 are mounted upon the shaft 1 adjacent the ends of the enlarged central portion 5 thereof. The bevel gears 10 and 11 are loosely mounted upon the shaft and have inwardly extending hubs 12 and 13 which terminate in flanges 14 and 15 adjacent to the flanges 8 and 9. Collars 16 and 17, which have inturned flanges extending over the flanges 8 and 14 and 9 and 15, respectively, serve to hold the bevel gears 10 and 11 against longitudinal movement with respect to the shaft. Suitable bearing washers may be provided between the flanges of the gears and shaft and between the flanges of the collar and the flanges of the gears. The gears 10 and 11 have clutch flanges 18 and 19 respectively providing internal conical clutch faces which are adapted to be engaged by the shiftable cone clutch members 20 and 21. The clutch members 20 and 21 have hubs 22 and 23, the outer portions of which have external screw threads to receive nuts 24 and 25 to which are secured keys 26 and 27 which extend through longitudinal slots 28 and 29 in the shaft 1. A push pin 30 fits slidably within the hollow shaft 1 and is provided with slots to receive the keys 26 and 27. By shifting the push pin 30, the clutch members 20 and 21 will be simultaneously shifted in the same direction, one toward its cooperating clutch member and the other away from its cooperating clutch member.

The shaft 1 has a reduced end portion 31 outside the fixed support 2 upon which is mounted a bracket 32 which has an arm 33 adapted to engage a pin on the fixed support 2 to hold the bracket against rotation. The bracket 32 is provided with a bronze bushing 34 which is fastened to the end portion 31 of the shaft and turns in the bracket and is held in place on the shaft by means of a lock nut 35 upon the outer end of the reduced portion 31 of the shaft which is screw threaded, a keeper 36 being provided outside the nut 35. The bracket 32 has parallel arms 37 and 38 on opposite sides of the shaft and projecting beyond the end of the shaft. The push pin 30 projects beyond the end of the shaft 1 and has a flange 39 beyond the end of the shaft. A bronze block 40 fits over the push pin 30 outside the flange 39 and is held in place by a washer 41 keyed to the push pin and a lock nut 42 and keeper 43 on the threaded end of the push pin outside the washer 41. A two part forked lever 44 has arms 45 which are pivoted to the outer ends of the arms 37 and 38 of the bracket. The arms have trunnions 46 at their ends which extend through the arms 37 and 38 and have flat inner faces engaging the ends of the block 40 on the push pin. Projecting from the inner face of each of the trunnions 46 is an eccentrically disposed pin 47 which engage recesses in opposite ends of the block 40. When the lever 44 is swung about its pivots the push pin 30 is moved in one direction or the other by means of the eccentric pins 47 acting through the block 40 on the push pin. The recesses receiving the pins 47 and the bearing of the trunnions in the arms 37 and 38 are sufficiently loose to permit the arcuate movement of the pins 47 without binding. When the lever 44 is in the position shown in Figs. 1 and 3, the push 30 is in neutral position and both the shiftable clutch members 20 and 21 are out of engagement. By shifting the lever toward one side or the other of the shaft either of the gears 10 and 11 may be clutched to the shaft.

Having described my invention, I claim:

1. In a clutch controlled mechanism, the combination wth a hollow shaft, cooperating clutch members on said shaft and a longitudinally movable clutch operating push pin within the shaft and rotatable therewith, of means for shifting the push pin in either direction comprising a bracket sleeved upon an end of said shaft and held against rotation with the shaft, said bracket having arms on opposite sides of the shaft which project past the end of the shaft, a collar loose upon said push pin beyond the end of said shaft, said coller being held against longitudinal movement with respect to the push pin, and a lever having a forked end straddling the push pin and pivoted on said arms, said lever having a part engaging said collar to shift said push pin.

2. In a clutch controlled mechanism, the combination wth a hollow shaft and cooperating clutch elements thereon and a longitudinally movable clutch operating push pin within the shaft and rotatable therewith, of means for shifting the push pin comprising a bracket sleeved upon an end of the shaft and held against rotation with the shaft, said bracket having arms upon opposite sides of the shaft which project past the end of the shaft, a two part forked lever having arms on the outer sides of said bracket arms, pivot trunnions extending inwardly from the arms of the lever and through said bracket arms, and eccentrically positioned pins on the inner faces of the pivot trunnions, a loose sleeve on said push pin having apertures therein to receive said eccentric pins, and means for holding said collar against longitudinal movement with respect to the push pin.

3. In a clutch controlled mechanism, a hollow shaft, clutch members mounted on the shaft, a longitudinally movable clutch operating push pin within the shaft, a fixed support for the shaft adjacent one end thereof, said shaft extending beyond said support, a bracket supported on said shaft, said bracket having an arm attached to said fixed support and spaced arms projecting beyond the end of the shaft on opposite sides of the push pin, said arms having aligned bearings disposed transversely of the pin and on opposite sides thereof, a collar on the projecting end of the push pin, and a lever having spaced arms provided with trunnions journaled in said bearings and inwardly extending projections engaging said collar to shift said push pin.

In testimony whereof, I hereunto affix my signature.

JAMES F. WRIGHT.